US008949277B1

(12) United States Patent
Lieuwen et al.

(10) Patent No.: US 8,949,277 B1
(45) Date of Patent: Feb. 3, 2015

(54) SEMANTIC GEOTOKENS

(75) Inventors: Daniel F. Lieuwen, Somerville, NJ (US); Andrew W. Hogue, Ho-Ho-Kus, NJ (US); Gregory A. Morris, New York, NY (US); Denis M. Lynch, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 12/982,164

(22) Filed: Dec. 30, 2010

(51) Int. Cl.
*G06F 17/30* (2006.01)
(52) U.S. Cl.
USPC .......................................... 707/794; 707/802
(58) Field of Classification Search
USPC .................................................. 707/794, 802
See application file for complete search history.

(56) References Cited

U.S. PATENT DOCUMENTS

| 6,263,335 | B1 | 7/2001 | Paik et al. | |
|---|---|---|---|---|
| 2005/0182770 | A1* | 8/2005 | Rasmussen et al. | 707/10 |
| 2006/0149774 | A1* | 7/2006 | Egnor | 707/102 |
| 2008/0228729 | A1* | 9/2008 | Frank et al. | 707/3 |
| 2008/0270375 | A1* | 10/2008 | Nanduri et al. | 707/5 |
| 2009/0119255 | A1* | 5/2009 | Frank et al. | 707/3 |
| 2009/0248663 | A1* | 10/2009 | Maniyar et al. | 707/5 |
| 2010/0179754 | A1* | 7/2010 | Faenger et al. | 701/208 |
| 2012/0059853 | A1* | 3/2012 | Jagota | 707/780 |

FOREIGN PATENT DOCUMENTS

EP  2209073  * 10/2010  .............. G06F 17/30

OTHER PUBLICATIONS

U.S. Appl. No. 12/896,059, filed Oct. 1, 2010, Manjunath Srinivasaiah et al.

* cited by examiner

*Primary Examiner* — Son T Hoang
(74) *Attorney, Agent, or Firm* — Bracewell & Giuliani LLP

(57) ABSTRACT

Methods, systems, and apparatus, including computer programs encoded on a computer storage medium, for providing geographically relevant search results. In one aspect, a method includes receiving a geotoken for a resource. The geotoken can be a resource token that references a geographic location. A semantic geotoken can be selected using the received geotoken. The semantic geotoken is a standardized representation of the geographic location that includes one or more location-specific terms. The semantic geotoken is stored with a reference to the resource. Neighboring locations for the geographic location are determined. The neighboring locations are within a predetermined distance of the geographic location. Semantic geotokens for the neighboring locations are selected and stored with the reference to the resource. Data specifying the semantic geotokens and the reference to the resource are provided.

24 Claims, 4 Drawing Sheets

SEMANTIC GEOTOKENS

BACKGROUND

This document relates to data processing.

The Internet provides access to a wide variety of resources such as video or audio files, web pages for particular subjects, book articles, or news articles. A search system can identify resources in response to a text search query that includes one or more search phrases (i.e., one or more words) or in response to user interactions with another interface. For example, a map interface can include a user interface element that allows a user to input or select search phrases. The search phrases that are submitted by a user through the map interface can include location information from the displayed map area. In response to receiving search phrases, the search system identifies resources that are responsive to the search phrases and ranks the resources, for example, based on their relevance to the search query and on measures of quality of the resources. In turn, the search system provides search results that reference (e.g., link to) the identified resources. The search results are typically ordered for viewing according to the rank.

Some users that provide a search query are interested in receiving search results referencing resources that include information relevant to a particular location. For example, a user that submits the search query "Atlanta Family Activities" may be searching for web pages that provide information about the city of Atlanta. Search results provided in response to the search query "Atlanta Family Activities" may include a web page that does not provide information about family activities in Atlanta, or even the city of Atlanta, but rather merely includes the word Atlanta.

For example, one resource referenced by the search results may be a retailer site that includes a drop-down menu enabling the user to specify their current location in order to identify retail locations near the selected location. Another resource may include the word Atlanta in a footnote of the resource that specifies a business location of the company that developed the web page. Although both of the resources described above include the text "Atlanta," it is unlikely that these resources would satisfy the informational needs of the user that submitted the search query for "Atlanta Family Activities" because these resources provide very little information about family activities in the city of Atlanta.

SUMMARY

In general, one innovative aspect of the subject matter described in this specification can be embodied in methods that include the actions of receiving a geotoken for a resource, the geotoken being a resource token that references a geographic location; selecting a semantic geotoken using the received geotoken, the semantic geotoken being a standardized representation for the geographic location including one or more location-specific terms for the geographic location; storing the semantic geotoken with a reference to the resource; determining neighboring locations for the geographic location, the neighboring locations being within a predetermined distance of the geographic location; selecting semantic geotokens for the neighboring locations; storing the semantic geotokens for the neighboring locations with the reference to the resource; and providing data specifying the semantic geotokens and the reference to the resource. Other embodiments of this aspect include corresponding systems, apparatus, and computer programs, configured to perform the actions of the methods, encoded on computer storage devices.

These and other embodiments can each optionally include one or more of the following features. Methods can further include the actions of receiving a search query that includes a reference to a geographic location that matches at least one of the semantic geotokens for the resource; and providing the resource in response to the request.

Selecting a semantic geotoken comprises selecting a semantic geotoken having a confidence score that exceeds a confidence threshold. Selecting a semantic geotoken having a confidence score can include selecting a semantic geotoken in which the confidence score is based, at least in part, on the distance between the geographic location referenced by the semantic geotoken and the geographic location specified by the resource. Selecting a semantic geotoken having a confidence score can include selecting a semantic geotoken in which the confidence score is based, at least in part, on a position of the geotoken in the resource.

Methods can further include the actions of receiving a search query that includes a reference to a geographic location; mapping the reference to the geographic location to a query semantic geotoken; obtaining search results responsive to the search query, at least one obtained search result referencing a resource having a semantic geotoken that matches the query semantic geotoken; adjusting result scores for the at least one obtained search result based on the match between the query semantic geotoken and the semantic geotokens for the at least one obtained search result; providing data that cause presentation of the search results in a presentation order that is based on the adjusted result scores.

Providing the data that cause presentation of the search results can include providing data that cause presentation of a portion of text from the resource that specifies the geographic location referenced by the resource. Receiving the search query that includes a reference to a geographic location can include receiving a search query that includes a reference to a geographic location of a user device that submitted the search query.

Methods can further include the action of identifying data in the resource that specify the geographic location. Methods can further include the actions of determining that the geographic location specified by the resource is specified with at least a threshold level of specificity, wherein the threshold level of specificity requires at least a city and state of the geographic location be specified; and in response to the determination, selecting the semantic geotoken for the resource.

Methods can further include the actions of determining that the geographic location specified on the resource is not specified with at least a threshold level of specificity; determining that the resource specifies less than a threshold number of different geographic locations; and based on the determinations, selecting the semantic geotoken for the geographic location referenced by the resource.

Methods can further include the actions of receiving a geographic relevance score for the geographic location, the geographic relevance score being a measure of relevance between a resource and a geographic location; determining that the geographic relevance score exceeds a threshold level; and in response to the determination, generating a geotoken for the resource.

The semantic geotoken can include location-specific terms, each of the terms separated by a delimiter. The semantic geotoken can include at least one location-specific term that is not included in the geotoken. The semantic geotoken can include an identifier corresponding to geographic locations stored in a geographic repository. The semantic geotoken can include a latitude and a longitude of a centroid of the geographic location.

Particular embodiments of the subject matter described in this specification can be implemented so as to realize one or more of the following advantages. The relevance of search results that are provided in response to a search query can be increased by selecting and providing search results that have been indexed according to semantic geotokens. The time required to provide search results in response to a query is reduced by reducing the quantity of "or" clauses that are required to be processed by a search system. The quantity of "or" clauses that are required to be processed by a search system are reduced by indexing resources according to semantic geotokens that specify a geographic location to which the resource has been identified as relevant and semantic geotokens specifying neighboring locations for the geographic location. The quantity of "or" clauses that are required to be processed by the search system are reduced by mapping location phrases of a search query to query semantic geotokens that are used to identify resources that are responsive to the search query. A search system can provide more relevant search results by adjusting result scores for resources based on a distance between locations that are referenced by the resources and a geographic location that is referenced by a location phrase in a search query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
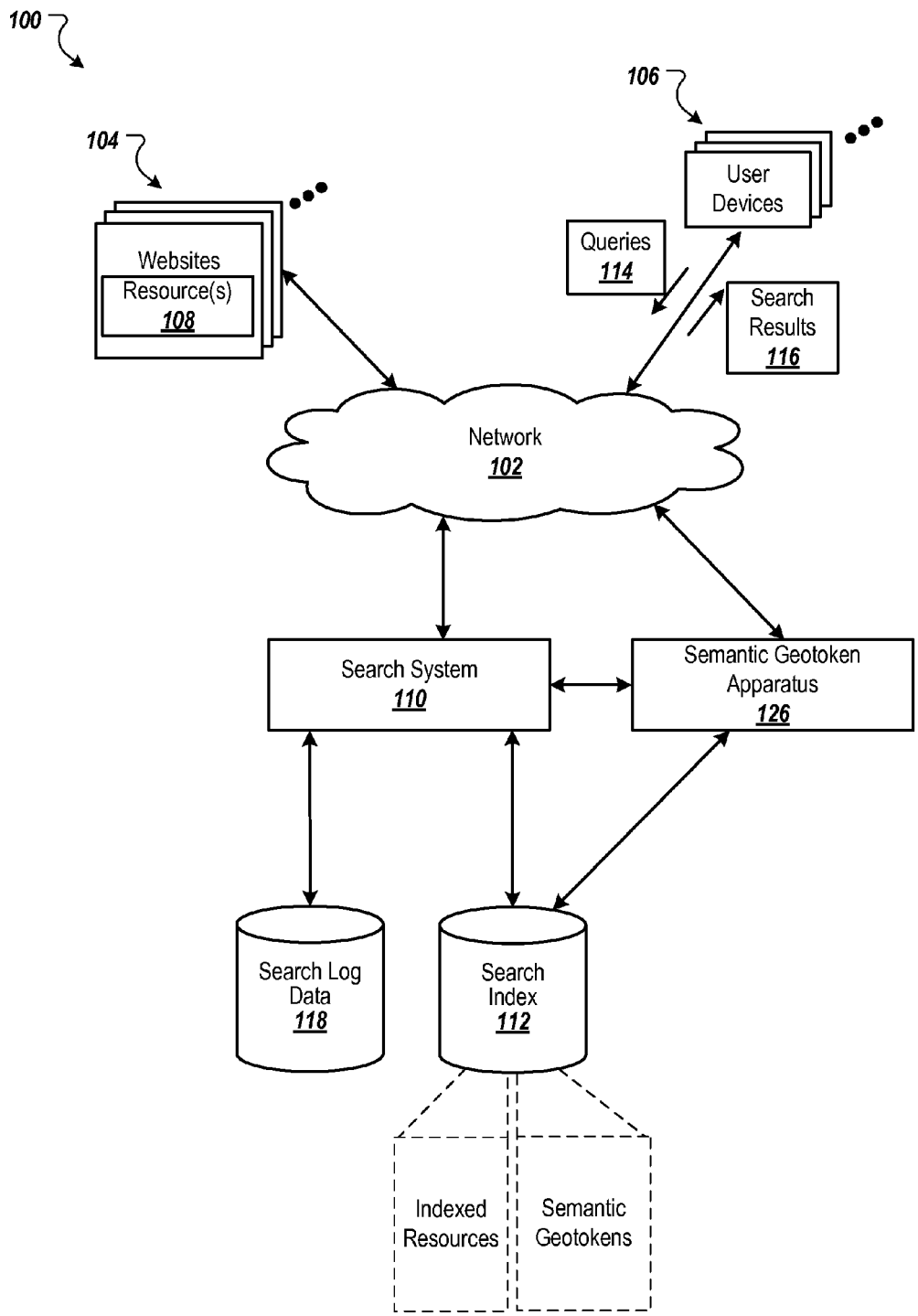
FIG. 1 is a block diagram of an example environment in which a search system provides search services.

Resources available over the Internet can reference geographic locations in a variety of ways. For example, one web page can provide information about a location at which a particular activity or business is located, while another web page can include a list of geographic locations from which a user can select their particular geographic location. Data specifying geographic locations that are referenced by a resource are referred to as geotokens that associate the resource with the geographic location. Analysis of geotokens (e.g., based on the quantity and location in the resource of the geotokens) can provide an indication of whether a resource is relevant to a particular geographic location, and, in turn, used by a search system to provide relevant search results in response to receipt of a search query that includes a location phrase (i.e., one or more terms that specify a geographic location for a search query).

Different resources may specify relevant geographic locations in different ways. For example, a restaurant web page may list the post office address of its location (i.e., an exact street address in a city, such as Atlanta). Meanwhile, a web page that lists local activities for a city may only reference the city name (e.g., Atlanta) without providing exact addresses for the listed activities. Although two resources may reference the same general geographic location (e.g., the city of Atlanta), the two resources can use different geotokens to specify that same general geographic location.

Due to the different geotokens that can be used to reference a same geographic location, many different alternative location phrases may need to be used to identify web pages that are relevant to a particular location. For example, if the search query "Family Activities 30309" is received, where 30309 is a zip code in Atlanta, a search system may need to rewrite the query to search for "Family Activities (30309 "or" Atlanta or Atlanta, Ga.)." The time required to process a search query generally increases in proportion to the number of alternative search terms (i.e., "or" clauses) that are processed by the search system. Therefore, search results can be provided more quickly by decreasing the number of alternative search terms (i.e., "or" clauses) that are added to a received search query.

Semantic geotokens can be used to reduce the number of alternative search terms that are used to locate resources. A semantic geotoken is a standardized expression that represents one or more location-specific terms for a geographic location. For example, resources that reference Atlanta, Ga. can be indexed to the semantic geotokens "atlanta_ga_us; 30309_us; 30312_us; 30313_us . . . ," such that the resources can be identified in response to either the search query "Family Activities Atlanta," or the search query "Family Activities 30309," without including alternative location phrases in the search query.

As resources are being indexed, neighboring geographic locations can also be associated with the resources. For example, a web page for a restaurant in Atlanta can be associated with neighboring towns or suburbs, such as Decatur, Ga., that are within a threshold distance of Atlanta. In this example, the restaurant can be associated with all of the semantic geotokens that reference the city of Atlanta expressed above, as well as references to Decatur (e.g., decatur_ga_us; 30034_us; 30035_us; . . . " Thus, the restaurant's web page can be identified as potentially relevant to a search query for "Restaurants Decatur" as described in more detail below.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many thousands web sites 104 and user devices 106.

A web site 104 is one or more resources 108 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 108 is any data that can be provided by the web site 104 over the network 102 and that is associated with a resource address. Resources 108 include HTML pages, word processing documents, portable document format (PDF) documents, images, video, and feed sources, to name just a few. The resources can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 108, the search system 110 identifies the resources 108 by crawling and indexing the resources 108. Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 114, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search results 116 are selected to be provided to a user device 106 in response to a search query 114 based on result scores. Result scores are scores that represent a measure of relevance of the resource 108 to a search query. For example, a result score for a resource 108 can be computed based on an information retrieval ("IR") score corresponding to the resource 108, and, optionally, a quality score of the resource 108 relative to other available resources. A presentation order for the search results 116 can be selected according to and/or using the result scores. In turn, data that cause presentation of the search results 116 according to the presentation order can be provided to the user device 106.

The search system 110 includes, or is in data communication with, a semantic geotoken apparatus 126 that generates semantic geotokens for resources. As described in more detail below, the semantic geotokens are used to identify resources that are considered relevant to a location phrase that is included in (or inferred from) a search query. The semantic geotoken apparatus 126 is a data processing apparatus including one or more processors that are configured to generate semantic geotokens for resources based on one or more references to geographic locations that are associated with the resource (e.g., text identifying a geographic location). A geographic reference is associated with a resource by being included in the resource and/or being included in a reference (e.g., an active link) to the resource. These geographic references are referred to as geotokens.

The semantic geotoken apparatus 126 can generate semantic geotokens for any geographic location, and store the semantic geotoken in a mapping table. The semantic geotoken for a particular location can include a set of location-specific terms (e.g., city names, zip codes, or state abbreviations) that reference the geographic location. For example, a semantic geotoken for the city of Atlanta can include the word "atlanta" and the state abbreviation "ga." The semantic geotoken can include delimiters between the location-specific terms, such as underscores or other delimiters. For example, the semantic geotoken for Atlanta can be "atlanta_ga_us." Alternatively, a repository of geographic information can be used, with a repository identifier for the corresponding location, such as an integer. In some implementations, a latitude and longitude of a centroid of the city or zip code can be used to represent the city or zip code.

The semantic geotoken apparatus 126 can also generate, for a particular location, semantic geotokens for neighboring locations. A neighboring location for a particular geographic location is another geographic location that is within a predetermined distance of the particular geographic location. For example, the neighboring locations for Atlanta may be pre-specified to include any city or town (or other specified geographic location) that is located within 10 miles of the centroid of Atlanta. For example, semantic geotokens for the cities of Decatur and/or Avondale Estates, which are both within 10 miles of the centroid of Atlanta can also be generated and associated with the resource as relevant to the resource.

The semantic geotoken apparatus 126 analyzes resources, as described in more detail below, to identify geotokens for the resource. In response to determining that a resource includes a geotoken for a particular location, the semantic geotoken apparatus 126 can select a semantic geotoken that is associated with the geotoken, and index the resource according to the semantic geotoken, the semantic geotokens of neighboring locations, and/or overlapping locations (e.g., an overlapping location can be a location designated by a zip code, which is also inside a city). For example, a web page that includes the geotoken "Atlanta," but does not include a reference to a zip code can also be indexed with the semantic geotoken that references 30309, such that the resource can be identified as relevant to a search query that includes the location phrase "30309."

In some implementations, the semantic geotoken apparatus 126 selectively determines which semantic geotokens to assign to a resource based on geographic relevance scores for geotokens from a resource. A geographic relevance score is a value specifying a likelihood that a resource is relevant to a geographic location that is referenced by a geotoken. As described in more detail below, the semantic geotoken apparatus 126 determines an "on-page" geographic relevance score for a resource 108. An "on page" geographic relevance score is a value specifying a measure of geographic relevance for a resource based on the geotokens that are included in the resource itself. The "on page" geographic relevance score can be determined based on a quantity, placement, and/or specificity of the geotokens (e.g., words, phrases, meta information, images, audio or other information specifying a geographic location) that are included in the resource 108. For example, a web page that includes the text "Atlanta, Ga." as a tag for the web page can have a higher on-page geographic relevance score for the location Atlanta than a web page that only includes the text "Atlanta" in a dropdown menu or other "boilerplate" content (e.g., content that is included in many different web pages independent of the topic to which the content is relevant).

In some implementations, the semantic geotoken apparatus 126 determines a confidence score for a semantic geotoken for a resource. The confidence score is a value indicating a likelihood that the resource is relevant to the location that is referenced by the semantic geotoken. In some implementations, the confidence score for a semantic geotoken for a resource is a function of the highest geographic relevance score that is associated with a geotoken that references the same geographic location as the semantic geotoken. For example, if a web page references Atlanta multiple times, the web page includes multiple geotokens that each reference Atlanta, and each of these geotokens can have a different geographic relevance score. The semantic geotoken that is generated from the "Atlanta" geotokens can have a confidence score that is based on the highest relevance score among the "Atlanta" geotokens. In some implementations, the confidence score is a function of all (or a proper subset) of the geographic relevance scores that are associated with geotokens that reference the same geographic location.

The semantic geotoken apparatus 126 can also compute an "off-page" geographic relevance score. The "off page" geographic relevance score is value specifying a measure of geographic relevance for a resource based on geotokens that are included in references to the resource (i.e., off-page geotokens), rather than, geotokens on the resource itself. For example, the semantic geotoken apparatus 126 can use a quantity of active links that link to a web page and that include the anchor text "Atlanta" (or other references to Atlanta, such as zip codes for Atlanta) to determine an off-page geographic relevance score for the resource relative to the location Atlanta. Thus, a web page that is more often referenced by active links having anchor text referencing "Atlanta" can have a higher "Atlanta" off-page geographic relevance score than another web page that is less often referenced by active links having anchor text referencing "Atlanta." In some implementations, the confidence score for the semantic geotoken for a resource is set to a highest off-page geographic relevance score that is associated with a single off-page geotoken that references the geographic location. In some implementations, the confidence score is a function of all (or a proper subset of) geographic relevance scores that are associated with off-page geotokens that reference the resource.

In some implementations, the semantic geotoken apparatus 126 can compute the confidence score of a semantic geotoken for a resource as a function of the on-page and off-page geographic relevance scores for the geotokens for the resource. For example, the confidence score for a semantic geotoken for a resource relative to a particular location can be a sum, product, or a value based on another function of the on-page and off-page geographic relevance scores that were determined for the resource using the geotokens that reference the particular location.

The semantic geotoken apparatus 126 can store the semantic geotoken for the resource 108 in the search index 112. Each semantic geotoken that is stored in the search index can be stored in association with (i.e., indexed according to and/or stored with a reference to) the resource for which the semantic geotoken was selected. Each semantic geotoken can also be stored in association with the confidence score for the semantic geotoken. The search system 110 can use the semantic geotokens and confidence scores to compute and/or adjust result scores for resources, as described in more detail below. For example, the result score may be computed as a dot product, or another function, of the information retrieval score, the quality score, and/or a confidence score for the semantic geotoken for the resource.

In some implementations, the semantic geotoken apparatus 126 does not associate (i.e., index the resource according to and/or store the resource with a reference to) a particular semantic geotoken (i.e., a semantic geotoken that references a particular location) with a resource when the confidence score for the particular semantic geotoken that fails to exceed a minimum confidence threshold. For example, the semantic geotoken apparatus 126 can compare the confidence score for a semantic geotoken for a resource to the confidence threshold, and store the particular semantic geotoken and corresponding confidence score only when the confidence score exceeds the confidence threshold. Thus, the resources that are assigned a particular semantic geotoken can be limited to those resources that are considered to be relevant to the geographic location referenced by the particular semantic geotoken with at least a minimum specified confidence level.

Figure 2:
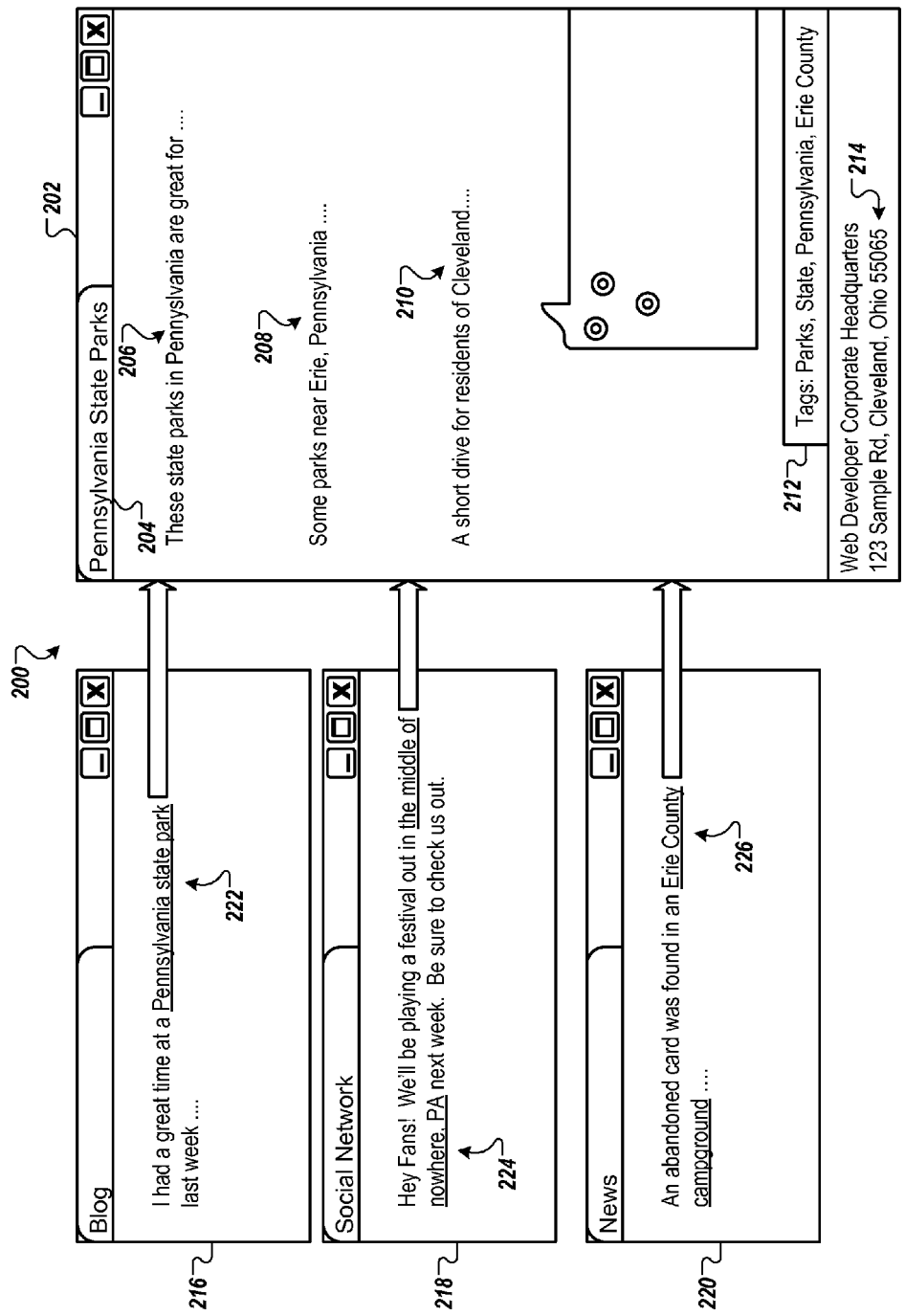
FIG. 2 is a block diagram of example resources that include geotokens.

FIG. 2 is a block diagram of example resources 200 that include geotokens. In some implementations, the resources 200 are web pages (or other online documents) that have been indexed by a search system. A computer system such as the semantic geotoken apparatus 126 examines tokens that have been indexed for (or are included in) resource 202 that includes content describing state parks in Pennsylvania. Tokens that include a full or partial reference to a geographic location can be identified as geotokens. For example, the resource 202 includes geotokens 204-214 (e.g., tokens referencing Pennsylvania, Erie, Cleveland, and other geographic locations).

The locations of the geotokens in the resource 202 are also identified by the computer system. In some implementations, the relevance of geotokens can be determined based, in part, on the locations of the geotokens in the resource 202. Different resource areas (e.g., title, main text, and tags) may be given different weights in a formula to determine the measures of relevance for the geotokens and, in turn, geographic relevance scores for the geotokens in the resource 202.

For example, the geotoken 204 is included in the title of the resource 202, and therefore, may be considered more influential for determining a geographic location to which the resource 202 is relevant than the geotoken 214 that is located in a footnote of the resource 202. In this example, the geotoken 204 may be assigned a higher "weight" for determining the relevance of the resource (i.e., relative to geographic locations) than the weight assigned to geotoken 214. Thus, geotoken 204 will be more influential than geotoken 214 for determining measures of relevance between the resource and particular geographic locations.

In some implementations, the weight assigned to a geotoken that appears in the title can be inversely proportional to a quantity of geographic locations that are referenced by geotokens in the title. If a single geographic location is referenced by a geotoken in a resource title, the weight assigned to the geotoken may be higher than the weight assigned to geotokens that respectively reference two or more different geographic locations. For example, when a single location is referenced by the title of the resource 202, it is more likely that the resource is relevant to the geographic location referenced by the geotoken than when multiple geotokens referencing multiple different locations are in the title.

Geotokens that are located near a beginning of a resource (e.g., within a threshold quantity of words of an article or within a threshold quantity of pixels of a top of the web page) are referred to as "leading geotokens" and may provide a reliable indication of the locations to which the resource 202 is relevant. Therefore, leading geotokens may be assigned a higher weight than geotokens that appear later in the resource (e.g., outside of the threshold quantity of words or outside of the threshold quantity of pixels).

For example, the geotoken 206 is in the first sentence of the first paragraph of the resource 202, and therefore, may be assigned a higher weight than the geotoken 208 that is included in the second paragraph of the resource 202. In another example, a news article might have a byline that includes a geotoken representing the location where the news article was filed and/or written. This geotoken may be assigned a higher weight than geotokens that appear later in the article because the location listed in the byline is often the location where events reported in the news article occurred. Therefore, this geotoken may be a reliable indication of a geographic location to which the news article is relevant.

Some resources (e.g., web pages) include tags, which may be presented to the user, as shown in the resource, or stored in meta information for the resource. These tags are often used by a resource author to facilitate indexing and discovery of a resource. Therefore, geotokens that are included in tags can be a reliable indicator of a location to which the resource is relevant. Accordingly, a geotoken that appears in a tag may be assigned a higher weight than a geotoken that appears in the body of an article. For example, the geotoken 212 is included in a tag of the resource 202 to indicate that the resource 202 is related to Erie County, Pennsylvania. Thus, the geotoken 212 may be assigned a higher weight than geotoken 210 because geotoken 210 was not identified, for example, as a leading geotoken, or otherwise determined to be assigned an increased weight.

Geotokens that are located in some portions of a resource can be eliminated or be assigned lower weights than other geotokens in the resource. For example, geotokens that are included in "boilerplate" content can be ignored, or be assigned a weight that is lower than the weights assigned to other geotokens in the resource. As noted above, boilerplate is content that is included in many different web pages independent of the topic to which the content is relevant. Example boilerplate includes document elements such as headers, footers, drop-down menus, and legal disclaimers. Boilerplate may be included in a resource to aid user navigation of the resource, to provide a consistent look and feel across web pages in a website, or may be the result of using a template to generate the resource. For example, the token 214 provides a location of the web developer that created the resource 202 in a footer of the resource 202. Therefore, the geotoken 214 can be identified as boilerplate since it is located in the footer of the resource 202.

Qualified geotokens can be assigned a higher weight than unqualified geotokens. Qualified geotokens are geotokens that are formed by the merger of two individual geotokens. For example, Cleveland and Ohio are both geotokens that when combined create the qualified geotoken "Cleveland, Ohio" (e.g., geotoken 214). The geotoken 214 is more specific than unqualified geotokens, such as the geotoken 210, which includes Cleveland, but does not include Ohio. Qualified geotokens generally include individual geotokens that are located adjacent to each other and/or appear in a specified sequence, but can be created from geotokens that are not adjacent to each other or in a specified sequence. For example, if Springfield and Ohio both appear on the page and no other states containing Springfield (e.g., Missouri or Illinois) appear on the page, then the geotokens Springfield and Ohio can be reliably combined to make the terms Springfield and Ohio less ambiguous.

Qualified geotokens may be more reliable indicators of a geographic location to which the geotoken is referring. For example, the unqualified geotoken "Cleveland" in isolation could be referring to one of at least twenty six cities, towns, or other municipalities in America that are named Cleveland. However, when "Cleveland" is qualified by (e.g., appears with) "Ohio," the location being referred to is less ambiguous. In some implementations, semantic geotokens are only selected for a resource when the geotoken has at least a threshold specificity. In these implementations, the geotoken can be required to be a qualified geotoken or otherwise refer to a geographic location with a minimum level of specificity. For example, the geotoken can be required to reference at least a city and state, and the references to the city and state can be required to be within a specified number of pixels of each other. Additionally, the geotoken can be required to reference a street address, and this reference to the street address can be required to be within a specified number of pixels of the references to the city and/or state.

Other resources, such as resources 216-220 can include references 222-226 (e.g., hypertext links) to the resource 200. Each of the references 222-226 includes a geotoken. For example, reference 222 includes the geotoken Pennsylvania, while reference 226 includes the geotoken Erie County. Inclusion of a geotoken in a reference to a target resource (e.g., resource 202) is an indication that the target resource is relevant to the location specified by the geotoken. Therefore, geotokens that reference a target resource can be used when computing the off-page geographic relevance score for the geotokens for the target resource. For example, when a large portion of references to the target resource include geotokens that reference a same geographic location, it is likely that the target resource is relevant to the referenced geographic location.

Figure 3:
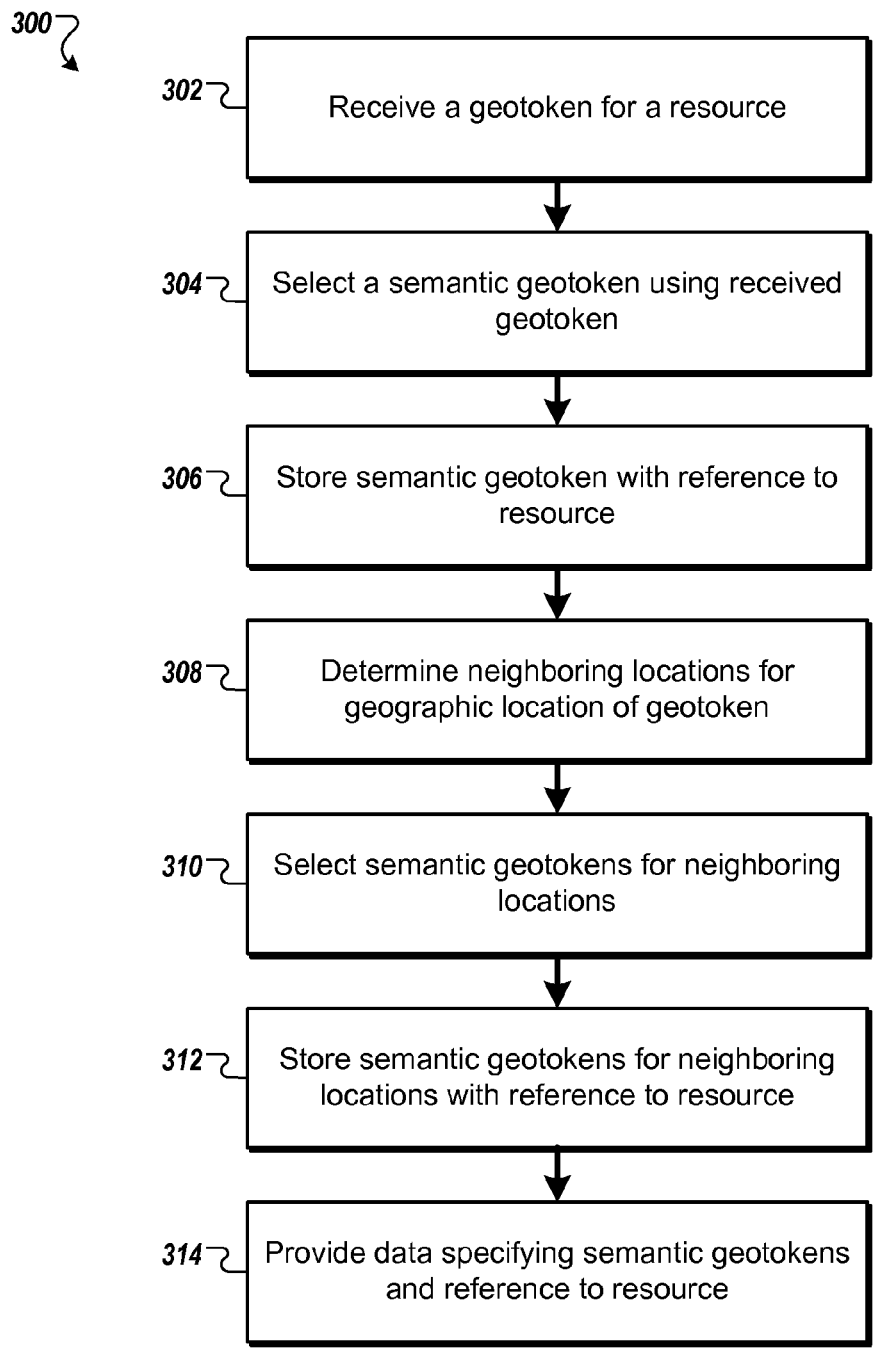
FIG. 3 is a flowchart of an example process for selecting semantic geotokens for a resource.

FIG. 3 is a flowchart of an example process 300 for selecting semantic geotokens for a resource. The process 300 is a process by which geotokens for a resource are received and a semantic geotoken is selected for a geographic location that is specified by the geotokens. A set of locations are selected as neighboring locations for the geographic location. Semantic geotokens are then generated for each of the neighboring locations for the geographic location, and data that specify the semantic geotokens and a reference to the resource are stored and provided.

The process 300 can be implemented, for example, by the semantic geotoken apparatus 126 and/or the search system 110 of FIG. 1. In some implementations, the semantic geotoken apparatus 126 is a data processing apparatus that includes one or more processors that are configured to perform actions of the process 300. In some implementations, a computer readable medium can include instructions that when executed by a computer cause the computer to perform actions of the process 300.

Geotokens for a resource are received (302). In some implementations, each geotoken is a resource token (i.e., a word, set of words, audio file, video file, or other unit of content) that references a geographic location. Each geotoken can be identified from a set of resource tokens that have been indexed for the resource, for example, in a data store that stores data for the resource (e.g., the search index 112 of FIG. 1). The geotokens can be identified from a set of tokens that are stored with a reference to an index number and data type such that the resource can be represented by a string of tokens that have been extracted from the resource. For example, the tokens can be compared to a data set of known geographic locations. Tokens that match or substantially match a known geographic location (e.g., tokens that are stubs, synonyms, common misspellings, alternative names for known geographic locations, or otherwise identified to represent known locations) are identified as geotokens for the resource.

A token may also be examined in the context of surrounding tokens to determine if the token is used as a geotoken. For example, a number, followed by a proper noun, followed by a type of street or street abbreviation may be identified as a street address and marked as a geotoken. Adjacent geotokens may be identified and combined to create a qualified geotoken. For example, the text "Erie, Pa." can be treated as a single qualified geotoken, as described with reference to FIG. 2.

A geographic relevance score can be computed for each geotoken received. The geographic relevance score can be based on the resolution of the geotoken, i.e., how precise a geographic location the geotoken references. For example, a geotoken that includes a full postal street address is a more precise geotoken than another geotoken that includes only a reference to a city. In some implementations, the geographic relevance scores for geotokens that are more precise are higher than the geographic relevance scores for less precise geotokens.

The geographic relevance score for each geotoken can also be based on a resource location (i.e., a location of the geotoken in the resource) of the geotoken. In some implementations, the resource location is specified by token attribute values. The token attribute values can also specify characteristics of the tokens. For example, in addition to specifying a location of the geotoken in a resource, the token attribute values can specify whether the geotoken is included in a tag for the resource or whether the geotoken is included in boilerplate content. The geotoken attribute values can also specify whether the geotoken is highlighted, bolded, or otherwise visually emphasized relative to other content that is presented with the resource. The geotoken attribute values can further specify whether the geotoken is included in a title of the resource or whether the geotoken is a merger of two or more tokens. In some implementations, when a geotoken is identified as being included in boilerplate, that geotoken can be removed from the geotokens that have been identified for the resource.

In some implementations, portions of resources that are considered areas of high importance (e.g., for determining relevance of a resource to a particular location) may be pre-defined, and geotokens that fall within those areas may be assigned higher geographic relevance scores than other geotokens. For example, portions of a resource that contain an overview, summary, or which—according to resource authoring convention—are indicative of locations to which the resource is relevant may be identified as areas in which geographic relevance score is increased relative to other geotokens. Examples of these high importance areas include a resource title, tag, and opening content (i.e., leading mentions). Geotokens that are considered to be in areas that are less indicative of the relevancy of the resource to a geographic location (e.g., boilerplate content) may be assigned a reduced geographic relevance score relative to other content, or be assigned a geographic relevance score of 0.

In some implementations, the geotokens for a particular resource can be geotokens for other resources that belong to the same web site or domain as the particular resource. For example, a restaurant can have a website with a "home" page resource and a separate "contact" page resource. The contact page can list the address of the restaurant, which can be identified as a geotoken for the contact page. The geotoken referencing the address of the restaurant can also be used as a geotoken for the home page resource, as the geotoken is likely to be relevant to the home page of the restaurant website.

A semantic geotoken is selected using the received geotoken (304). The semantic geotoken can be a standardized representation of the geographic location that is referenced by the geotoken. The semantic geotokens can be selected, for example, from a data store that stores semantic geotokens that are indexed by the geographic location for which the semantic geotoken was created.

In some implementations, a semantic geotoken can be selected for a resource that includes a single high-precision geotoken (i.e., a geotoken having a precision that exceeds a precision threshold). For example, the precision threshold can require inclusion of a street address, rather than just a mention of a city. Another precision threshold can require references to a zip code, as opposed to an entire city. If there are multiple precise geographic locations referenced on a resource, multiple geotokens and multiple semantic geotokens can be generated for each geographic location.

In some implementations, semantic geotokens are selected for resources that include low-precision geotokens (i.e., geotokens having a precision that does not exceed the precision threshold) if there are fewer than a threshold quantity of different geographic locations referenced. For example, in some implementations, the semantic geotoken apparatus 126 determines that a particular geographic location specified by a resource is not specified with at least the threshold precision. In response to this determination, the sematic geotoken apparatus 126 determines whether the resource specifies a threshold number of different geographic locations. If the resource does not specify at least the threshold number of different geographic locations, a semantic geotoken can be selected for the particular geographic location. If the resource does specify at least the threshold number of different geographic locations, a semantic geotoken will not be selected for the particular geographic location.

The precision of a particular geotoken relates to a specificity with which a particular geographic location is referenced. For example, a geotoken that specifies a street address is more precise than a geotoken that specifies only a city and/or state. As described above, a confidence score is a value indicating a likelihood that a particular resource is relevant to a particular geographic location. The confidence score can be computed based on the precision of the geotokens that are included in the resource, the locations of the geotokens in the resource, and other factors (e.g., the number of geotokens that reference the particular location and/or a number of different geographic locations referenced by the resource.) As noted above, a single high-precision geotoken can provide sufficient confidence that a resource is relevant to a particular geographic location, while multiple lower-precision geotokens may be required to provide sufficient confidence of relevance to a geographic location.

In some implementations, the semantic geotoken can include location-specific terms that each references the geographic location that is referenced by the semantic geotoken. For example, a web page for a restaurant can list "555 Example St., Atlanta, Ga., 30303," as the address of the restaurant. As described above, this address can be identified as a high-precision geotoken, such that the inclusion of this geotoken alone provides sufficient confidence that the resource is relevant to the location Atlanta, Ga. Therefore, "Atlanta, Ga." and the zip code "30303" can be selected as geotokens for which semantic geotokens are associated with the web page in this example.

The semantic geotoken for "Atlanta, Ga." can be expressed as "atlanta_ga_us." The semantic geotoken includes underscore delimited references to the location-specific terms, "atlanta," "ga," and "us," referring to the city, state, and country, respectively. The semantic geotoken for zip code "30303" can be expressed as "30303_us," which includes the location-specific terms "30303" and "us." In some implementations, the semantic geotokens are standardized to "[city]_[state]_[country]" and/or "[zip (or postal) code]_[country]." The semantic geotokens can include location-specific terms that are not included in the geotoken. For example, the country information is not included in "Atlanta, Ga.," but the semantic geotoken can include the country information in the location-specific term "us." The semantic geotokens can also include information regarding the resolution of the geotoken that was included in the resource. For example, when the example address above is used to select the semantic geotokens "atlanta_ga_us" and "30303_us," the semantic geotokens that are associated with the resource can include an indicator, such as "STREET_LEVEL," to indicate that the original resolution of the geotoken was a street level address. In some implementations, semantic geotokens that are selected to express a geographic location can include more precise location-specific terms or less precise location-specific terms than those provided in the examples above. In some implementations, multiple resolutions can be used for indexing. For example, a semantic geotoken for the state, region, or country can be indexed as well. In some implementations, the semantic geotokens can be translated to a coordinate system or some other system that provides standard identifiers to geographic locations. For example, semantic geotokens can be translated to longitudinal and latitudinal coordinates. In some implementations, integers or some other synthetic identifier associated with a repository of geographic information can be used.

In some implementations, geotokens for the same resource and that reference the same geographic location can be grouped as one geotoken. The semantic geotoken for a group of geotokens can use the highest geographic relevance score among the group of geotokens that reference the same geographic location. In some implementations, a separate semantic geotoken can be generated for each received geotoken, regardless of whether the received geotokens refer to the same geographic location or not. In some implementations, having separate semantic geotokens for each geotoken on the resource can allow the search system to provide snippets of information or text with the semantic geotoken and the reference to the resource in a search result. The snippet of information can include text from the resource that includes the geographic location. The snippet of information can provide the context of the reference to the geographic location from which the geotoken was generated. In some implementations, a semantic geotoken is selected from geotokens with geographic relevance scores that exceed a threshold geographic relevance score.

The semantic geotokens are stored with a reference to the resource (306). The reference to the resource can be a network location (e.g., a uniform resource identifier) for the resource or another reference that uniquely identifies the resource. The reference can be stored with all the semantic geotokens that were selected using the geotokens for the resource. The confidence scores of each of the semantic geotokens can be stored with the semantic geotokens. In some implementations, each semantic geotoken generated is stored with a separate reference to the resource, for example, as semantic geotoken-reference pairs (e.g., Resource_URL:Semantic_Geotoken_1; Resource_URL:Semantic_Geotoken_2 or Semantic_Geotoken_1:Resource_URL; Semantic_Geotoken_2:Resource_URL). In some implementations, all the semantic geotokens are stored together with the reference to the resource (e.g., Resource_URL:Semantic_Geotoken_1: Semantic_Geotoken_2). The semantic geotokens and the reference to the resource can be stored with corresponding confidence scores in the search index 112 of FIG. 1.

Neighboring locations for the geographic location of the geotokens are determined (308). Neighboring locations are geographic locations having centroids that are less than a threshold distance away from the centroid of the geographic location referenced by the geotoken. For example, with a threshold distance of 10 kilometers, the city of Raritan, N.J. may be considered a neighboring location for a restaurant in Somerville, N.J. In some implementations, the neighboring locations include the cities and zip codes within the threshold distance. Neighboring locations can be determined for providing geographically relevant search results. For example, a user looking for pizza in Somerville may be willing to travel to Raritan, or to other restaurants, within a reasonable distance.

Semantic geotokens are selected for the neighboring locations (310). The semantic geotokens for the neighboring locations can be selected in a manner similar to the semantic geotokens of the referenced geographic locations. The confidence score of neighboring semantic geotokens can be adjusted based on the distance between the neighboring location and the referenced geographic location. In some implementations, confidence scores for neighboring locations can be lowered in proportion to the distance of the neighboring locations to the referenced geographic location. For example, the semantic geotoken "somerville_nj_us" can be used to select neighboring semantic geotokens including, "<08807_us, 0.0>," "<08869_us, 0.0>," "<08896_us, 1.98>," "<raritan_nj_us, 3.04>," where the number indicates the distance in kilometers. The first two semantic geotokens have distances of "0.0" as the two zip codes overlap with Somerville, N.J. These distances can be factored into the confidence score of the semantic geotoken. Thus, the confidence score for the neighboring semantic geotoken can be a function of the geographic relevance score of the underlying geotoken (which would reference Somerville, N.J., in this example), adjusted by the distance.

Lowering the confidence score based on distance can result in resources that reference neighboring locations that are further away being referenced lower in search results than equally relevant resources that reference closer neighboring locations. For example, for a user searching for pizza restaurants in Somerville, a resource referencing a pizza restaurant in Raritan may be relevant to the search query, but to a lesser extent than resources referencing pizza restaurants in Somerville.

The semantic geotokens for the neighboring locations are also stored with a reference to the resource (312). The semantic geotokens for the neighboring locations can be stored with the reference to the resource in a manner similar to the semantic geotokens from the resource. The neighboring semantic geotokens can be stored with corresponding confidence scores in separate semantic geotoken-reference pairs, or with the semantic geotokens from the resource.

Data specifying the semantic geotokens and the reference to the resource are provided (314). In some implementations, the data are provided to a search system that uses the data to service search queries that specify a geographic location. In some implementations, the data are stored and indexed according to the resource.

Figure 4:
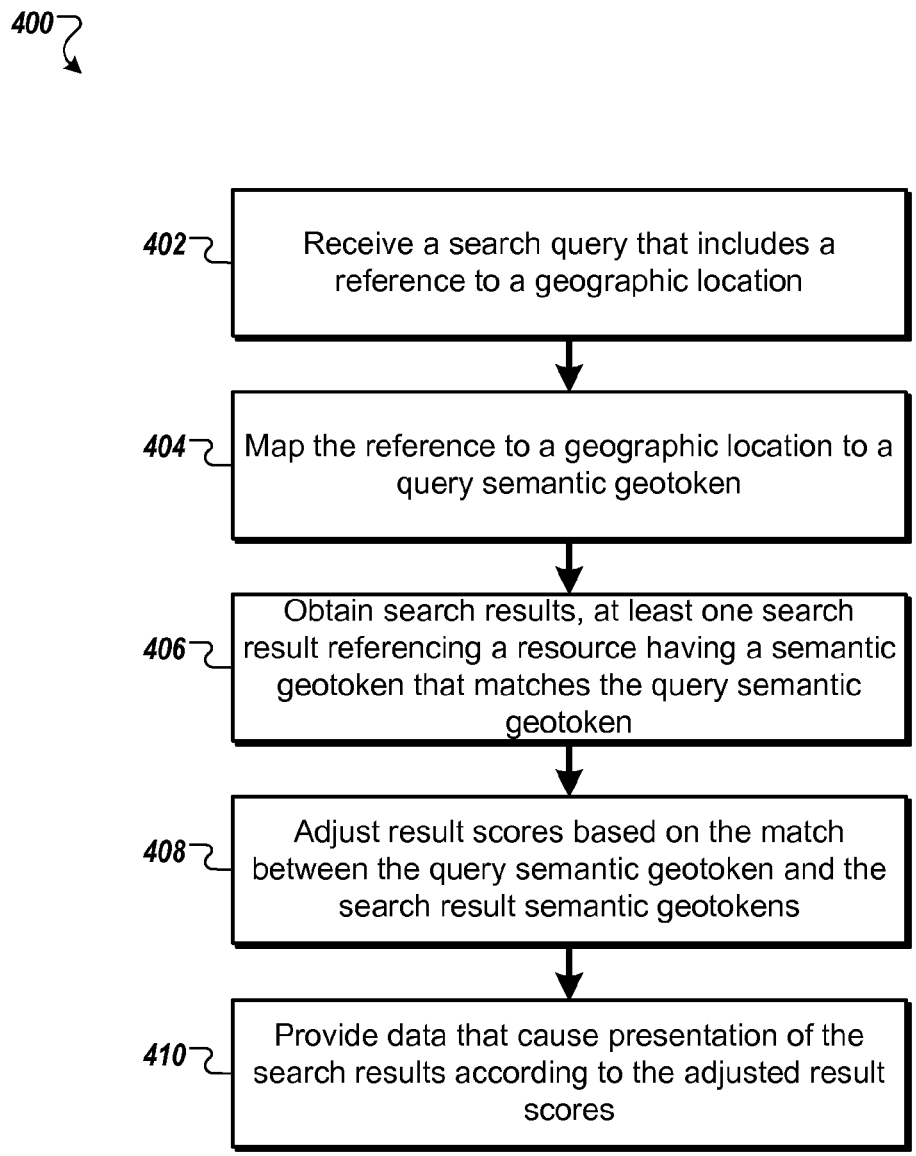
FIG. 4 is a flowchart of an example process for providing search results using semantic geotokens.

FIG. 4 is a flowchart of an example process 400 for providing search results using semantic geotokens. The process 400 is a process by which a set of search results having semantic geotokens that match a location phrase of a search query are selected. In turn, result scores for the selected search results are adjusted based on confidence scores for the semantic geotokens. Data that cause presentation of the search results according to the adjusted result scores are then provided. In some implementations, the adjustment of the result scores results in a reordering of the search results for presentation. For example, a search result that is most relevant to a geographic location specified by the query (e.g., according to the semantic geotoken confidence scores) can be promoted (e.g., assigned a higher page presentation position)

following adjustment of the result scores, while a search result that is less relevant may be demoted (e.g., assigned a lower page presentation position) following adjustment of the result scores.

The process 400 can be implemented, for example, by the semantic geotoken apparatus 126 and/or the search system 110 of FIG. 1. In some implementations, the semantic geotoken apparatus 126 is a data processing apparatus that includes one or more processors that are configured to perform actions of the process 400. In other implementations, a computer readable medium can include instructions that when executed by a computer cause the computer to perform actions of the process 400.

A search query that includes a reference to a geographic location is received (402). In some implementations, the query includes a location phrase (i.e., one or more terms that specify a geographic location for a search query). A location phrase can be a city name, a zip code, a latitude/longitude coordinate pair, or another geographic identifier.

Location phrases can match a geographic identifier for a particular geographic location by having a geographic identifier that includes any reference to the particular geographic region (e.g., zip code) or includes a reference to a location that is within a specified distance of a the particular geographic region. For example, if the particular geographic location includes the city of San Francisco and all areas within 50 miles of the center of San Francisco, then geographic identifiers for queries that reference the city of San Francisco (e.g., zip code 94131), or locations within 50 miles of the city of San Francisco, (e.g., Oakland, Calif.), will match the geographic identifier for the San Francisco region.

In some implementations, the location phrase can be determined and/or inferred based on a location of a user device that submitted the search query. The location of the user device can be detected based on user device data that is provided with the search query. For example, a user location associated with a particular search query can be detected using user profile data provided by the user and/or an anonymized Internet Protocol (IP) address (e.g., a hash value computed using the IP address) corresponding to the user device. When the user device is a mobile device (e.g., cell phone, Personal Data Assistant, smart phone, or other portable data communications device) the user location can also be provided by location-based services (e.g., GPS) that have been enabled by the user.

The reference to the geographic location is mapped to a query semantic geotoken (404). A query semantic geotoken is a semantic geotoken that is selected (e.g., by the apparatus 126 of FIG. 1) for a search query that includes a reference to a geographic location. The query semantic geotoken is used to identify search results that have a semantic geotoken that matches the query semantic geotoken.

Mapping the reference to the geographic location to a query semantic geotoken can be accomplished in a manner similar to producing geotokens from references to geographic locations on a resource. For example, if a user inputs a search query, "Chicago weather," the term "Chicago" can be determined to be a reference to a geographic location and mapped to the semantic geotoken "chicago_il_us." The search query can be rewritten to include a semantic geotoken, as well as the original search query text. Similarly, the query "Chicago, Ill. USA Weather" can be rewritten so that the semantic geotoken "chicago_il_us" map to the words "Chicago," "Illinois," and "USA" in the query. Thus, even if a resource only mentioned the word "Chicago," the resource could be identified as responsive to the query.

A set of search results responsive to the query are obtained, at least one search result referencing a resource having a semantic geotoken that matches the query semantic geotoken (406). The set of search results can include, for example, those search results having a highest N result scores relative to the search query. The search results and corresponding result scores can be received, for example, from the search system 110 of FIG. 1. As described with reference to FIG. 1, the result scores can be determined by the search system 110, for example, based on IR scores for resources referenced by the search results and/or quality measures for the resources. The result scores can be used, for example, to select an initial or default ranking for the search results.

The result scores are adjusted for the at least one obtained search result based on the match between the query semantic geotoken and the semantic geotokens for the at least one obtained search result (408). In some implementations, the confidence scores of the semantic geotokens are used to adjust the result scores for search results that are matched by the query semantic geotoken. The result scores can be adjusted, for example, by computing a sum, product, or another function (e.g., a logarithmic function) of the result scores and the confidence scores of the matched semantic geotokens.

Data that cause presentation of the search results according to the adjusted result scores are provided (410). The data can be provided in response to receipt of the search query. For example, the data can specify a list of search results and a relative (or absolute) presentation position for each of the search results. The data can be packaged into a data format for transmission to the user device that submitted the search request previously. For example, the search results can be included in a web page or application message, which may also optionally include navigation elements, control elements to modify the search query, links to additional or sponsored resources, graphics, and appropriate meta information, to name a few.

The description above describes selecting resources that have been pre-indexed to semantic geotokens in response to a search query that includes a location phrase. In some implementations, the location phrase may be inferred based on a geographic location of the user, as described above. In these implementations, the search results that are selected can include search results for resources that reference geographic locations that are within a threshold distance of the inferred location.

For example, if the user is using a GPS enabled device to submit a search query, the user can enable location-based services that enable the device to provide data specifying the user's location with the search query. In this example, the user's location can include the city and/or zip code, which can be mapped to a query semantic geotoken. Alternatively or in addition, the user's location can be expressed as a grid location on a map representation (or a latitude/longitude coordinate pair). The map representation can be segmented, for example, into grid portions (e.g., squares), and the grid portion that represents the users location can be submitted with the search query. Using the user's location and the size of the grid portions, resources that reference locations inside (and/or have been indexed to) grid portions that are within a threshold distance of user's location can be selected in response to the search query. In turn, the search results provided to the user can include the selected search results.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus for managing geotokens, the method comprising:
   receiving a geotoken for a resource, the geotoken being a resource token that references a geographic location;
   selecting a semantic geotoken using the received geotoken for the resource, the semantic geotoken being a standardized representation for the geographic location, wherein the semantic geotoken is selected based on a geographic relevance score for the geotoken for the resource, the geographic relevance score specifying a likelihood that the resource is relevant to the geographic location that is referenced by the geotoken for the resource;
   calculating a confidence score for the semantic geotoken based, at least in part, on a geographic distance between a referenced geographic location in the semantic geotoken and the geographic location referenced by the geotoken for the resource;
   determining, via a processor, that the confidence score for the semantic geotoken exceeds a confidence threshold;
   in response to the determination, storing the semantic geotoken with a reference to the resource in a search index;
   determining neighboring locations for the geographic location, the neighboring locations being within a predetermined distance of the geographic location;
   selecting semantic geotokens for the neighboring locations; and
   storing the semantic geotokens for the neighboring locations with the reference to the resource in the search index.

2. The method of claim 1, further comprising:
   receiving a search query that includes a particular reference to a particular geographic location that matches at least one of the semantic geotokens that is stored in the search index; and
   providing a search result referencing a particular resource that is referenced by a matching semantic geotoken in the search index in response to the search query.

3. The method of claim 1, wherein the confidence score for the semantic geotoken is further based on a number of off-page geotokens that are included in resources that reference the resource.

4. The method of claim 1, wherein the confidence score for the semantic geotoken is further based, at least in part, on a position of the geotoken in the resource.

5. The method of claim 1, further comprising:
   receiving, from a client device, a search query that includes a particular reference to a particular geographic location;
   mapping the particular reference to the particular geographic location to a query semantic geotoken;
   obtaining search results responsive to the search query, at least one obtained search result referencing a particular resource that is referenced by a matching semantic geotoken in the search index that matches the query semantic geotoken; and
   providing data that cause presentation of the search results to the client device.

6. The method of claim 5, wherein providing the data that cause presentation of the search results comprises causing presentation of a portion of text from the at least one obtained search result.

7. The method of claim 5, wherein receiving the search query that includes the particular reference to the particular geographic location comprises receiving the search query that includes the particular reference to a geographic location of the client device that submitted the search query.

8. The method of claim 1, further comprising:
   determining that the geotoken that references the geographic location has at least a threshold level of specificity.

9. The method of claim 1, further comprising:
   determining that the geotoken that references the geographic location does not have at least a threshold level of specificity; and
   determining that the resource has fewer than a threshold number of geotokens that reference different geographic locations.

10. The method of claim 1, wherein the standardized representation for the geographic location includes location-specific terms, each of the terms being separated by a delimiter.

11. The method of claim 1, wherein the semantic geotoken includes at least one location-specific term that is not included in the geotoken.

12. The method of claim 1, wherein the semantic geotoken includes an identifier corresponding to geographic locations stored in a geographic repository.

13. The method of claim 1, wherein the semantic geotoken includes a latitude and a longitude of a centroid of the geographic location.

14. A non-transitory computer storage medium encoded with a computer program, the program comprising instructions that when executed by data processing apparatus cause the data processing apparatus to perform operations for managing geotokens comprising:

receiving a geotoken for a resource, the geotoken being a resource token that references a geographic location;

selecting a semantic geotoken using the received geotoken for the resource, the semantic geotoken being a standardized representation for the geographic location, wherein the semantic geotoken is selected based on a geographic relevance score for the geotoken for the resource, the geographic relevance score specifying a likelihood that the resource is relevant to the geographic location that is referenced by the geotoken for the resource;

calculating a confidence score for the semantic geotoken based, at least in part, on a geographic distance between a referenced geographic location in the semantic geotoken and the geographic location referenced by the geotoken for the resource;

determining that the confidence score for the semantic geotoken exceeds a confidence threshold;

in response to the determination, storing the semantic geotoken with a reference to the resource in a search index;

determining neighboring locations for the geographic location, the neighboring locations being within a predetermined distance of the geographic location;

selecting semantic geotokens for the neighboring locations; and storing the semantic geotokens for the neighboring locations with the reference to the resource in the search index.

15. A system for managing semantic geotokens comprising:

one or more computers operable to interact with a user device and further operable to perform operations including:

receiving a geotoken for a resource, the geotoken being a resource token that references a geographic location;

selecting a semantic geotoken using the received geotoken for the resource, the semantic geotoken being a standardized representation for the geographic location, wherein the semantic geotoken is selected based on a geographic relevance score for the geotoken for the resource, the geographic relevance score specifying a likelihood that the resource is relevant to the geographic location that is referenced by the geotoken for the resource;

calculating a confidence score for the semantic geotoken based, at least in part, on a geographic distance between a referenced geographic location in the semantic geotoken and the geographic location referenced by the geotoken for the resource;

determining that the confidence score for the semantic geotoken exceeds a confidence threshold;

in response to the determination, storing the semantic geotoken with a reference to the resource in a search index;

determining neighboring locations for the geographic location, the neighboring locations being within a predetermined distance of the geographic location;

selecting semantic geotokens for the neighboring locations; and storing the semantic geotokens for the neighboring locations with the reference to the resource in the search index.

16. The system of claim 15, wherein the one or more computers comprise one or more servers operable to interact with the user device through a data communication network, and the user device is operable to interact with the one or more servers as a client.

17. The system of claim 15, wherein the one or more computers are further operable to perform operations including:

receiving a search query that includes a particular reference to a particular geographic location that matches at least one of the semantic geotokens that is stored in the search index; and providing a search result referencing a particular resource that is referenced by a matching semantic geotoken in the search index in response to the search query.

18. The system of claim 15, wherein the confidence score for the semantic geotoken is further based on a number of off-page geotokens that are included in resources that reference the resource.

19. The system of claim 15, wherein the confidence score for the semantic geotoken is further based, at least in part, on a position of the geotoken in the resource.

20. The system of claim 15, wherein the one or more computers are further operable to perform operations including:

receiving, from a user device, a search query that includes a particular reference to a particular geographic location;

mapping the particular reference to the particular geographic location to a query semantic geotoken;

obtaining search results responsive to the search query, at least one obtained search result referencing a particular resource that is referenced by a matching semantic geotoken in the search index that matches the query semantic geotoken; and adjusting result scores for the at least one obtained search result based on match level between the query semantic geotoken and the semantic geotokens for the at least one obtained search result; and providing data that cause presentation of the search results to the user device.

21. The system of claim 20, wherein providing the data that cause presentation of the search results comprises causing presentation of a portion of text from the at least one obtained search result.

22. The system of claim 20, wherein receiving the search query that includes the particular reference to the particular geographic location comprises receiving the search query that includes the particular reference to a geographic location of the user device that submitted the search query.

23. The system of claim 15, wherein the one or more computers are further operable to perform operations including:

determining that the geotoken that references the geographic location has at least a threshold level of specificity.

24. The system of claim 15, wherein the one or more computers are further operable to perform operations including:

determining that the geotoken that references the geographic location does not have at least a threshold level of specificity; and determining that the resource has fewer than a threshold number of different geographic locations.

\* \* \* \* \*